US009281707B2

(12) United States Patent
Cordes et al.

(10) Patent No.: US 9,281,707 B2
(45) Date of Patent: Mar. 8, 2016

(54) SYSTEM AND METHOD FOR CHARGING A BATTERY

(75) Inventors: Kevin Cordes, Miller Place, NY (US); Christopher R. Paul, Bayport, NY (US); David T. Lundquist, Stony Brook, NY (US); Joseph Cabana, Centereach, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 881 days.

(21) Appl. No.: 13/556,656

(22) Filed: Jul. 24, 2012

(65) Prior Publication Data

US 2012/0297230 A1    Nov. 22, 2012

Related U.S. Application Data

(62) Division of application No. 11/757,644, filed on Jun. 4, 2007, now Pat. No. 8,253,388.

(51) Int. Cl.
*H02J 7/00* (2006.01)

(52) U.S. Cl.
CPC ......... *H02J 7/0073* (2013.01); *H02J 2007/006* (2013.01)

(58) Field of Classification Search
CPC .................. H02J 7/0055; H02J 2007/0062
USPC ................... 320/125, 132, 138, 162
See application file for complete search history.

(56) References Cited

U.S. PATENT DOCUMENTS

| 7,564,220 | B2 | 7/2009 | Niculae et al. |
| 2003/0057922 | A1 | 3/2003 | Odaohhara et al. |
| 2006/0287007 | A1* | 12/2006 | Veselic et al. ................. 455/572 |
| 2008/0162968 | A1 | 7/2008 | Breen et al. |

OTHER PUBLICATIONS

Final Office Action mailed on May 12, 2011 in U.S. Appl. No. 11/757,644, Kevin Cordes, filed Jun. 4, 2007.
Non Final Office Action mailed on Oct. 6, 2010 in U.S. Appl. No. 11/757,644, Kevin Cordes, filed Jun. 4, 2007.
Notice of Allowance mailed on May 15, 2012 in U.S. Appl. No. 11/757,644, Kevin Cordes, filed Jun. 4, 2007.

* cited by examiner

*Primary Examiner* — Edward Tso
*Assistant Examiner* — Aaron Piggush

(57) ABSTRACT

Described is a system and method for charging a battery. The system includes a processor powered by a battery; and a controller determining a remaining battery charge of the battery. The controller sets a first charge current to recharge the battery when the remaining battery charge is insufficient to operate the processor. The controller wakes the processor when the battery has been recharged so that the remaining battery capacity is sufficient to operate the processor. The processor negotiates for a second charge current to recharge the battery. The controller sets the second charge current when the processor successfully negotiated.

9 Claims, 4 Drawing Sheets

SYSTEM AND METHOD FOR CHARGING A BATTERY

CROSS REFERENCE TO RELATED APPLICATIONS

This Application is a divisional of U.S. patent application Ser. No. 11/757,644 filed on Jun. 4, 2007, the contents of which are expressly incorporated herein by reference in their entirety.

FIELD OF THE INVENTION

The present invention relates generally to a system and method for charging a battery of a mobile unit. Specifically, the mobile unit may utilize a universal serial bus (USB) port as a first means to recharge a battery independent of the state of the battery.

BACKGROUND

A mobile unit (MU) utilizes a battery to allow the MU to function without the need to be hard wired into a power source. The battery is often rechargeable so that the battery may be reused. Various methods of recharging the battery exist. For example, in certain MUs, the battery may be removed and placed into a battery charger. Once fully charged, the battery may be placed back into the MU. In another example, the MU may be equipped with a battery charger incorporated within the housing of the MU. The MU may be placed into a cradle to connect the MU to a power supply allowing the battery to be recharged.

SUMMARY OF THE INVENTION

The present invention relates to a system and method for charging a battery. An exemplary embodiment of the system according to the present invention may include a processor powered by a battery; and a controller determining a remaining battery charge of the battery. The controller sets a first charge current to recharge the battery when the remaining battery charge is insufficient to operate the processor. The controller wakes the processor when the battery has been recharged so that the remaining battery capacity is sufficient to operate the processor. The processor negotiates for a second charge current to recharge the battery. The controller sets the second charge current when the processor successfully negotiated.

An exemplary embodiment of the method according to the present invention may include the following steps. A remaining battery charge of a battery for a mobile unit is determined. A determination is also made if the remaining battery capacity is sufficient to operate a processor of the mobile unit. A first charge current is set to recharge the battery when the remaining battery capacity is insufficient to operate the processor.

DETAILED DESCRIPTION

Figure 1:
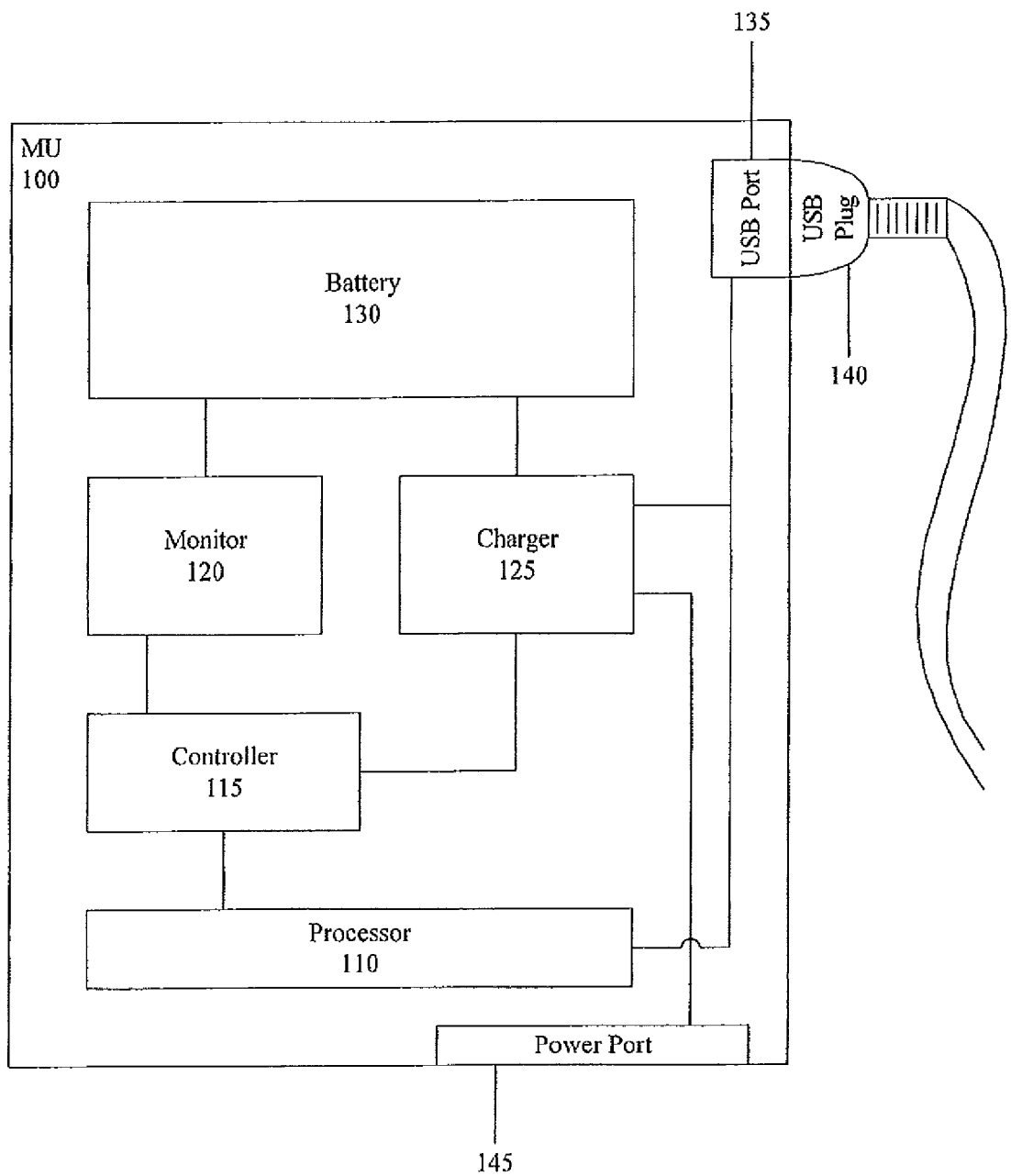
FIG. 1 shows components of a mobile unit when being recharged by a USB port according to an exemplary embodiment of the present invention.

The present invention may be further understood with reference to the following description and the appended drawings, wherein like elements are referred to with the same reference numerals. The exemplary embodiments of the present invention describe a system and method to charge a battery of a mobile unit (MU). According to the exemplary embodiments of the present invention, the battery may be recharged using a universal serial bus (USB) port, a power port, or a combination thereof. Furthermore, according to the exemplary embodiments of the present invention, a determination of charge current to recharge the battery may depend on the connected power supplies. The USB port, power port, and charge current will be discussed in detail below.

FIG. 1 shows components of a mobile unit (MU) 100 when being recharged via a USB port 135 according to an exemplary embodiment of the present invention. The MU 100 may be any device that is capable of being used without a need for a hard-wired source of power. However, it should be noted that the MU 100 may also be used with a hard-wired source of power. The MU 100 may be, for example, a computing device, a personal computer, a laptop, a pager, a mobile device, a cell phone, a radio frequency identification device, a scanner, etc. The MU 100 may include a processor 110, a controller 115, a monitor 120, a charger 125, a battery 130, a USB port 135, and a power port 145. The power port 145 will be discussed in more detail below with reference to FIGS. 3-4.

The processor 110 may be a central computing component that operates the MU 100. Connected to the processor 110 is the controller 115. The controller 115 may be a microcontroller (i.e., a computer-on-a-chip). The controller 115 may enable and/or disable other components that are under the control of the controller 115. Furthermore, the controller 115 may also initiate and/or stop certain functionalities of the other components that are under the control of the controller 115. As a microcontroller, the controller 115 may function independently of the processor 110 and may also manage certain functionalities of the processor 110. In addition, the controller 115 may require a lesser minimum power in order to operate in comparison to the processor 110. It should be noted that the controller 115 being disposed as a separate unit from the processor 110 is only exemplary. The controller 115 may be integrated into the processor 110, may be a stand alone circuit within an integrated circuit board (ICB) containing the processor 110, etc.

The battery 130 may be a portable power supply that provides the energy to the MU 100 when the MU 100 is not connected to an outside power supply (e.g., a wall socket). The battery 130 may be rechargeable so that the same battery may be reused by refilling the capacity of the battery 130. The battery 130 may be, for example, a nickel cadmium battery, a lithium ion battery, a nickel hydride battery, etc.

The monitor 120 may be a device that oversees the operations of the battery 130. The monitor 120 may include functionalities to oversee a variety of battery operations. For example, the monitor 120 may include a charge sensor to read the charge that the battery 130 holds. That is, the charge sensor may monitor the amount of discharge the battery 130 has undergone, the amount of charge the battery 130 remains, etc, The charge sensor may determine the charge of the battery 130 by measuring voltage and/or current. In another example, the monitor 120 may include a temperature sensor to read the temperature of the battery 130. A temperature sensor may be useful if the heat generated by the battery 130 goes beyond a safety threshold that may adversely affect the battery itself, the MU 100, and/or the components of the MU 100. The monitor 120 may include other sensors that indicate operating conditions of the battery 130.

The charger 125 may be a device that oversees the recharging operations of the battery 130. The charger 125 may be connected to the different power supplies available and reroute the power to the battery 130. The charger 125 may alter the properties of the incoming power in preparation for recharging the battery 130. The charger 125 may also be responsible for the level of charge current to which the battery 130 is recharged. Those skilled in the art will understand that a battery has a maximum charging capacity threshold and recharging the battery 130 beyond this threshold may result in damage to the battery 130.

The USB port 135 may be a port that receives a USB plug 140. The USB port 135 may be a conventional USB port found on various computing devices, The USB plug 140 may be attached to another hardware device such as another computing device, referred to as a host device (host). The USB plug 140 and the USB port 135 may facilitate a variety of functionalities. For example, a data exchange may be accomplished from the host to the MU 100 if the USB port 135 is connected to the processor 110.

It should be noted that the MU 100 may include other components not shown in FIG. 1. For example, the MU 100 may include a memory that stores programs, data, etc. The MU 100 may also include imagers (e.g., barcode scanners, optical scanners, etc.), a voice input/output, a radio and antenna, etc.

Figure 2:
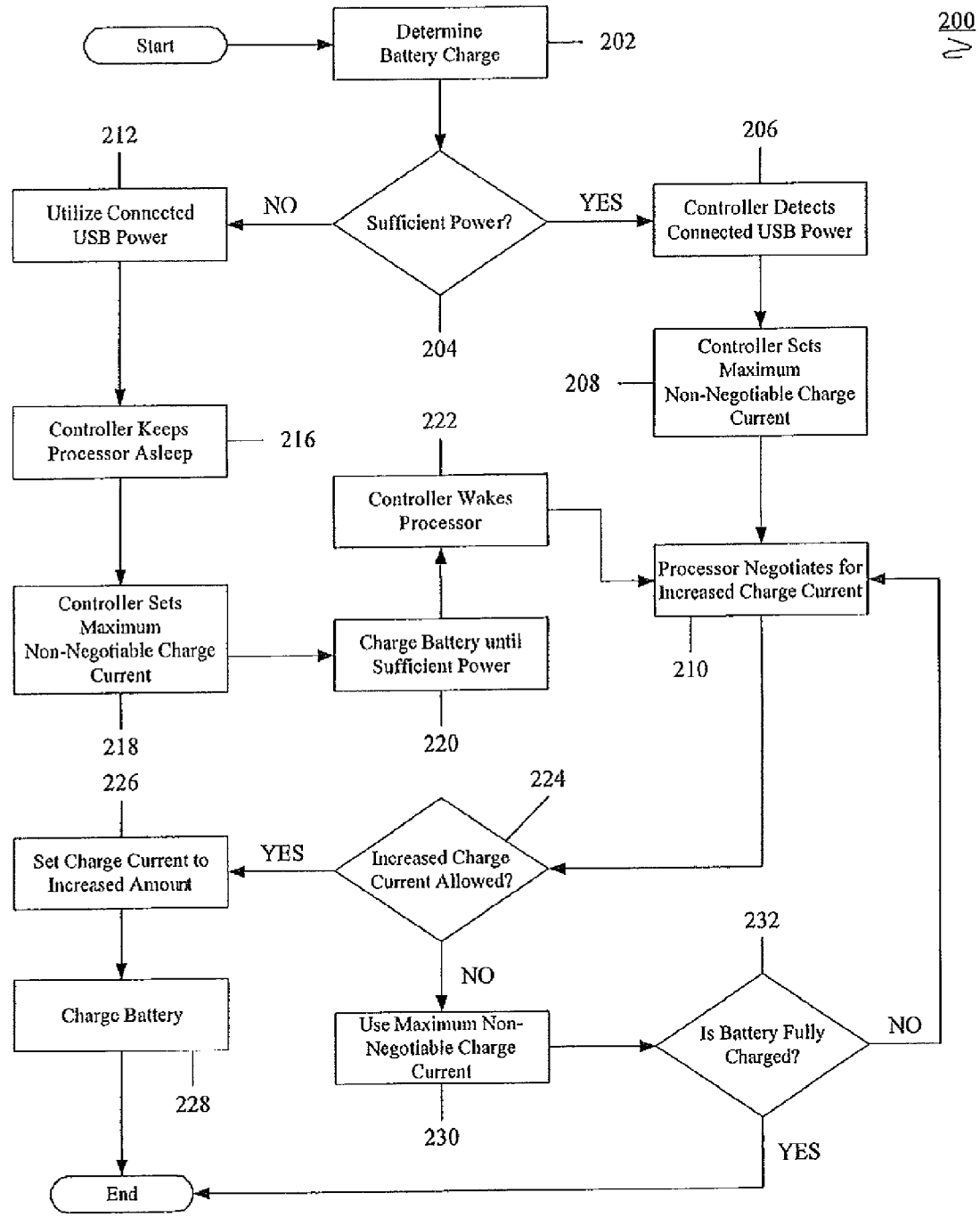
FIG. 2 shows a method of recharging a battery using a USB port according to an exemplary embodiment of the present invention.

FIG. 2 shows a method 200 of recharging the battery 130 using the USB port 135 according to an exemplary embodiment of the present invention. The method 200 will be described with reference to the MU 100, the components of the MU 100, and the USB plug 140 of FIG. 1. The method 200 may be used when the power supply to recharge the battery 130 is only available through the USB port 135. The method 200 considers the parameters and limitations of the USB port 135 to most efficiently recharge the battery 130. Furthermore, the method 200 may be accomplished independent of the available charge on the battery 130, as will be discussed below. When the only power supply to recharge the battery 130 comes from the USB port 135, two scenarios may be relevant: when the battery 130 still has some remaining charge and when the battery 130 is completely discharged. However, it should be noted that other scenarios may arise when the only power supply comes from the USB port 135.

In step 202, the battery charge is determined. Using the monitor 120, the charge of the battery 130 may be measured. As discussed above, the monitor 120 may measure the battery charge in a variety of manners. For example, the monitor 120 may use a charge sensor to measure voltage, current, etc. Consequently, the battery charge may be extrapolated. The monitor 120 may be controlled by the controller 115. The controller 115 utilizing less power than the processor 110 may allow the measurement to be made by the monitor 120. The method 200 assumes that the USB plug 140 has already been connected to the USB port 135. Thus, regardless of the battery 130 being completely discharged, the controller 115 may be powered using the USB port 135 to achieve control of the monitor 120. The manner in which the controller 115 is powered through the USB port 135 will be discussed in detail below.

However, it should be noted that the method 200 assuming the USB plug 140 already being connected to the USB port 135 is only exemplary. Those skilled in the art will understand that the method 200 may be slightly modified to address the USB plug 140 not being connected to the USB port 135. For example, a first step may include manually connecting the USB plug 140 into the USB port 135. In another example, a step may include detecting the USB plug 140 in the USB port 135. Until this detection takes place, the controller 115 does nothing.

In step 204, a determination is made whether the battery 130 has sufficient power to operate the processor 110. The level of sufficient power may refer to the minimum energy requirements to run the processor 110. As will be discussed below, the processor 110 may include a control over certain aspects of the functionalities of the MU 100 that the controller 115 is incapable of controlling. The level of sufficient power may be dependent on a variety of factors such as the type of processor 110 used in the MU 100, For example, the MU 100 may include a relatively sophisticated processor that runs at higher speeds and carries out numerous operations concurrently. This type of processor may require more power to operate than a relatively simple processor that runs at a lower speed and carries out a single operation at any given time. This determination may be made using the controller 115.

If step 204 determines that there is sufficient power, the method 200 continues to step 206. In step 206, the controller 115 detects that there is a connected USB power from the USB port 135. The controller 115 may detect that the USB plug 140 is inserted into the USB port 135 in a variety of direct or indirect manners. For example, the reception of a signal (e.g., data signal) from the USB port 135 may indicate that the USB plug 140 has been inserted. In another example, the USB port 135 may be equipped with a sensor so that when the USB plug 140 is inserted therein, the USB port 135 may transmit a signal to the processor 110 and/or the controller 115 indicating that the USB plug 140 has been inserted.

In step 208, the controller 115 sets the charger 125 to recharge the battery 130 using a charge current of the maximum allowable charge current that may be set by the controller 115 without requiring the processor 110 to negotiate for additional charge current from the host. This maximum non-negotiable charge current may be, for example, 100 ma. Those skilled in the art will understand that current USB ports allow a charge current of 100 ma without requiring the processor to negotiate for additional charge current. Those skilled in the art will also understand that any current value that is the maximum or less may be set in this step. However, the maximum non-negotiable charge current may be the most efficient setting. Thus, the method 200 utilizes the maximum charge current where the processor 110 is not necessary.

The method 200 then proceeds to step 210. Step 210 is also part of the path when step 204 determines that the battery 130 has insufficient remaining power. Thus, step 210 and beyond will be discussed with reference to step 204 determining insufficient power.

Returning to step 204, if step 204 determines that the battery 130 has insufficient remaining power, the method 200 continues to step 212. In step 212, the USB power from the USB port 135 being connected with the USB plug 140 is utilized. This power may be used by the controller 115. As discussed above, the controller 115 may require less power to operate than the processor 110. Thus, by using the allotment (e.g., 100 ma) provided through the USB port 135 from the host, the controller 115 is able to operate.

In step 216, the controller 115 keeps the processor 110 asleep. The controller 115 may determine to keep the processor 110 asleep in a variety of manners. For example, the controller 115 may assume that the MU 100 was deactivated because that there was insufficient charge in the battery 130. The controller 115 may detect that the battery 130 requires recharging, thereby keeping the processor 110 asleep (since the processor requires a comparatively high amount of energy). In another example, the controller 115 may use the battery charge that was determined in step 202. If the battery charge that was determined is below a predetermined threshold (a threshold that may be dependent on the processor), the controller 115 may keep the processor 110 asleep.

In step 218, the controller 115 sets the charger 125 to recharge the battery 130 using the maximum non-negotiable charge current (e.g., 100 ma) (i.e., without requiring the processor 110 to negotiate with the host). Thus, the controller 115 may independently set the charger 125 to this charge current to recharge the battery 130 from the USB port 135.

The controller 115 may concurrently monitor the recharging progress of the battery 130. That is, the controller 115 may activate the monitor 120 to measure the battery charge once the recharging process has started. Thus, in step 220, the battery 130 is charged so that the battery charge is at least the sufficient power level used as a threshold in step 204. That is, the battery 130 is charged so that the battery charge is at least the sufficient power level to operate the processor 110. In step 222, the controller 115 wakes the processor 110. Once the battery charge of the battery 130 has reached at least the sufficient power level to operate the processor 110, the processor 110 may function.

In step 210, the processor 110 negotiates with the host for an increased charge current to recharge the battery 130. The controller 115 may request the processor 110 for an increased charge current. As discussed above, the processor 110 may include a control over certain aspects of the functionalities of the MU 100. One such aspect may be the negotiation for an increased charge current used by the charger 125 when recharging with the USB port 135. For example, the processor 110 may negotiate with the host to increase the charge current from 100 ma to 500 ma. As discussed above, the charge current is set at 100 ma, which is the maximum allowable charge current without the need for the processor 110 to negotiate with the host. Since the processor 110 is operational due to sufficient capacity of the battery 130, the processor 110 may negotiate for the increased charge current. It should be noted that the controller 115 requesting the processor 110 is only exemplary. Once the processor 110 is awake, the processor 110 may be fully operational. Thus, with sufficient power present at the battery 130, the processor 110 may take over the recharging process for the battery 130.

In step 224, a determination is made whether the increased charge current is allowed. Depending on the host, the increased charge current may not be available. The host may require a certain amount of power and allotting further energy may not be allowed. However, if the host is, for example, a generator, the increased charge current may be automatic.

If step 224 determines that the increased charge current is allowed, the method 200 continues to step 226. In step 226, the increased charge current is used to recharge the battery 130. The processor 110 may inform the controller 115 that the requested increase in charge current is allowed by the host. Consequently, the controller 115 may increase the charge current of the charger 125 from the previous level (100 ma) to the increased level (500 ma). In step 228, the battery is charged at the increased charge current.

If step 224 determines that the increased charge current is not allowed, the method 200 continues to step 230. In step 230, the present charge current may be further used. However, with a lower charge current, the requisite time to fully charge the battery 130 is increased. Thus, the method continues to step 232. In step 232, a determination is made if the battery 130 is fully recharged. If the battery 130 is fully charged, then the method 200 ends. However, if the battery 130 is not yet fully charged, the method 200 returns to step 210 where the processor may again negotiate for an increased charge current. It should be noted that the method 200 may bypass the step 232. Such a scenario may occur if the first attempt made by the processor 110 to negotiate for an increased charge current from the host resulted in reply indicating an indefinite denial for the increased charge current.

Figure 3:
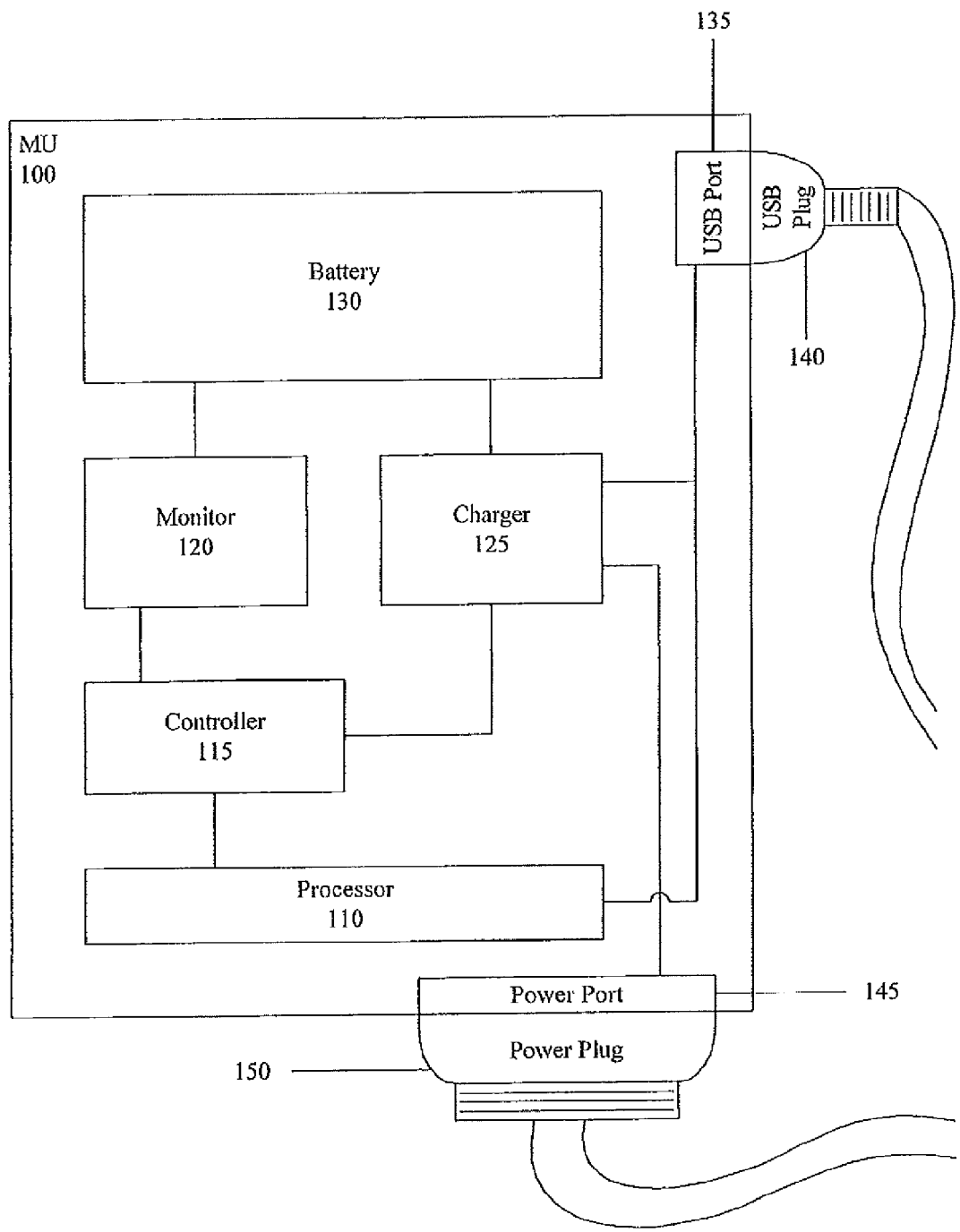
FIG. 3 shows components of a mobile unit when being recharged by a USB port and a power port according to an exemplary embodiment of the present invention.

FIG. 3 shows components of the MU 100 when being recharged by the USB port 135 and the power port 145 according to an exemplary embodiment of the present invention. The MU 100 includes substantially the same components described above with reference to FIG. 1. In addition to the USB plug 140 inserted into the USB port 135, the MU 100 of FIG. 3 also includes a power plug 150 inserted into the power port 145. The power port 145 may be a port that receives the power plug 150. The power port 145 may be a conventional power port found on various computing devices with battery chargers disposed within the MU 100. In one example, the power port 145 may be a set of contacts and the power plug may be a corresponding set of contacts on a cradle that creates a connection between a power source and the MU 100. Those skilled in the art will understand that there are many examples and embodiments of power ports 145 and power plugs 150. The power plug 150 may be attached to a hardware device specifically designed to provide power. The hardware device may include another connector that connects to a power supply such as a wall socket. The power plug 150 may supply a greater charge current than that provided by the USB plug 140.

Figure 4:
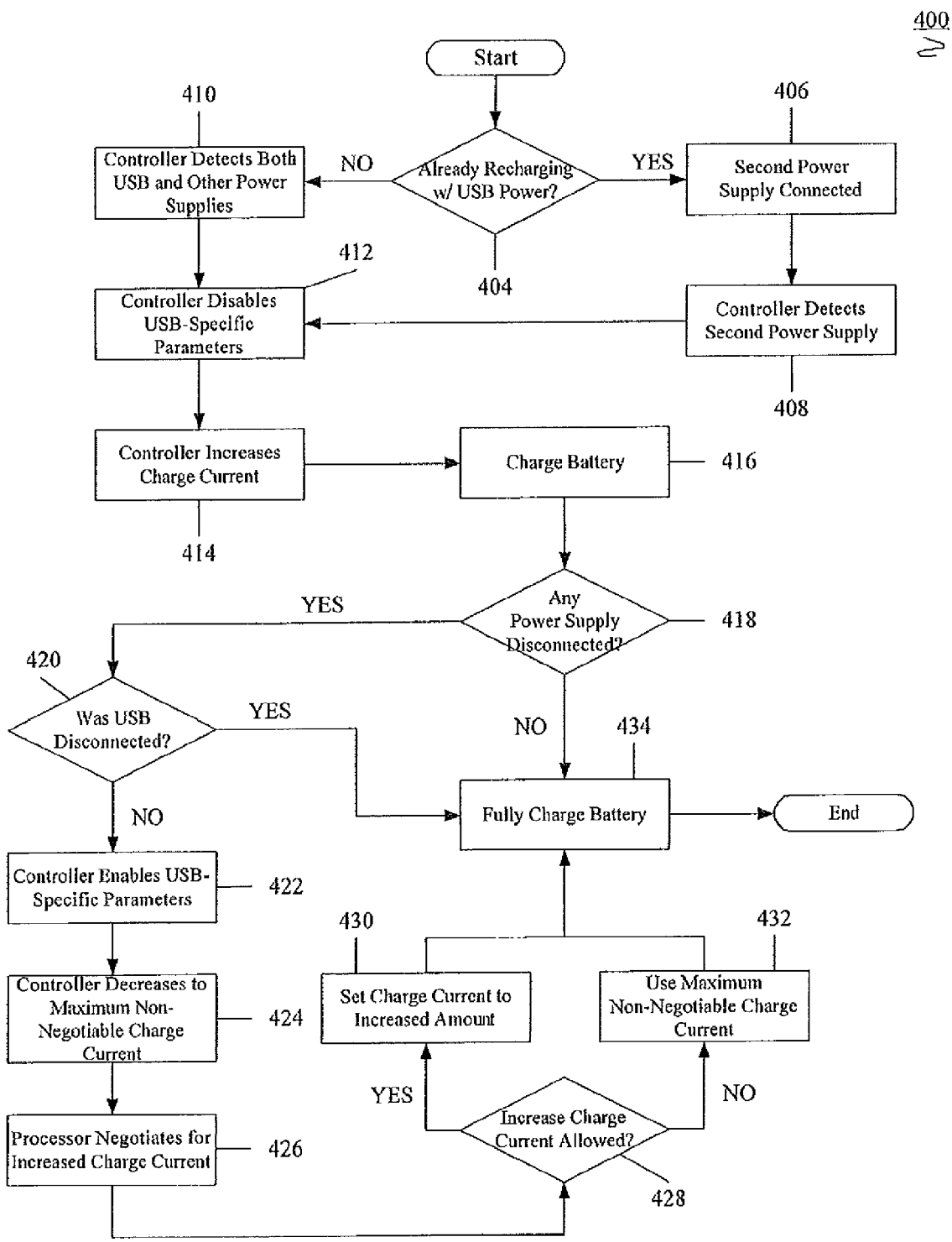
FIG. 4 shows a method of recharging a battery using a USB port and a power port according to an exemplary embodiment of the present invention.

FIG. 4 shows a method 400 of recharging the battery 130 using the USB port 135 and the power port 140 according to an exemplary embodiment of the present invention. The method 400 will be described with reference to the MU 100, the components of the MU 100, the USB plug 140, and the power plug 150 of FIG. 1. The method 400 will also be described with reference to various steps of the method 200 of FIG. 2. The method 400 may be used when multiple power supplies are available to recharge the battery 130. The method 400 considers the parameters and limitations of the USB port 135 when used in conjunction with another power source such as the power supply connected via the power port 145. The method 400 may be accomplished independent of the available charge on the battery 130, as will be discussed below. When multiple power supplies are available to recharge the battery 130, two scenarios may be relevant: when the battery 130 is being recharged with a first power supply and a second power supply and when the battery 130 is being recharged with a first power supply and a second power supply is subsequently added. However, it should be noted that other scenarios may arise when multiple power supplies are available to recharge the battery 130.

It should be noted that the method 400 assumes that at least the USB plug 140 is connected to the USB port 135. Thus, regardless of the battery 130 being completely discharged, the controller 115 may be powered using the USB port 135 to achieve control of the monitor 120. However, it should be noted that the method 400 assuming the USB plug 140 already being connected to the USB port 135 is only exemplary. Those skilled in the art will understand that the method 400 may be slightly modified to address the USB plug 140 not being connected to the USB port 135 in a substantially similar manner discussed above.

In step 404, a determination is made whether the battery 130 is already being recharged with USB power. As discussed above, the method 400 assumes that the USB plug 140 is connected to the USB port 135. Thus, the battery 130 may already be recharging. The battery 130 may be recharged using the USB port 135 in a substantially similar manner as described with reference to the method 200 of FIG. 2.

If step 404 determines that the battery 130 is already being recharged with USB power, then the method 400 continues to step 406. In step 406, the second power supply is connected. The second power supply may come from the power plug 150 connected to the power port 145. It should be noted that the second power supply may already be connected. That is, step 406 assumes that the second power supply is not supplying power to recharge the battery 130. In step 408, the controller 115 detects the second power supply. The method 400 continues to step 412. Step 412 is also part of the path when step 404 determines that the battery 130 is not being recharged with USB power. Thus, step 412 and beyond will be discussed with reference to step 404 determining no recharge with USB power.

If step 404 determines that the battery 130 is not already being recharged with USB power, the method 400 continues to step 410. In step 410, the controller 115 detects multiple power supplies. For example, the multiple power supplies may include the USB power (e.g., the USB plug 140 connected to the USB port 135) and the second power supply (e.g., the power plug 150 connected to the power port 145). The controller 115 may detect the power supplies by being powered in a substantially similar way as described above with reference to the controller 115 activating the monitor 120.

In step 412 (from either step 410 or step 408), the controller 115 disables the USB-specific parameters. The USB-specific parameters may pertain to, for example, a maximum allowable charge current that comes through the USB port 135. As discussed above, the charge current provided from the connection of the power plug 150 to the power port 145 may be greater than the charge current provided from the connection of the USB plug 140 to the USB port 135. The controller 115 may have set the charger 125 to recharge the battery 130 at a charge current that is the highest possible charge current provided by USB power. Thus, the controller 115 may disable the settings placed on the charger 125 so that a higher charge current may be used. It should be noted that the term "disable" does not necessarily entail that the USB-parameters are shut off. Instead, the term "disable" merely refers to the USB-parameters no longer being used. It should also be noted that the step 412 may be bypassed by the method 400. For example, the controller 115 may not have set the charger 125 to USB-specific parameters. In such a scenario, the controller 115 may simply alter the charge current that the charger 125 is to use to recharge the battery 130.

Therefore, whether the USB-specific parameters are disabled or the method 400 bypasses step 412, the controller 115 increases the charge current in step 412. The increase in charge current may correspond to a maximum charge current provided through the power plug 150 being connected to the power port 145. It should be noted that the increase in charge current may also correspond to any value that is between the maximum charge current provided by USB power and the maximum charge current provided by the other power supply.

In step 416, the battery 130 is recharged. It should be noted that the method 400 may end after step 416 when the battery 130 is fully recharged. However, the method 400 may also consider scenarios that may occur during the recharging process. For example, in step 418, a determination is made whether any power supply has been disconnected. Step 418 considers the scenario if USB power or the second power supply has been disconnected. It should be noted that the term "disconnected" does not entail the USB plug 140 or the power plug 150 being physically removed from the respective port. Instead, the term "disconnected" may also refer to the host device in which the other end of the USB plug 140 or the power plug 150 has ceased to provide energy. That is, the term "disconnected" refers to one of the power supplies no longer providing a charge current to recharge the battery 130.

If step 418 determines that no power supply has been disconnected, the method 400 continues to step 434, In step 434, the battery 130 is fully recharged. If step 418 determines that a power supply has been disconnected, the method 400 continues to step 420. In step 420, a determination is made whether the disconnected power supply was the USB power.

If step 420 determines that the disconnected power supply was the USB power, the method 400 continues to step 434 where the battery 130 is fully recharged. If the USB power supply was disconnected, then the remaining power supply is the second power supply (e.g., the power plug 150 being connected to the power port 145). Thus, the settings of the charger 125 may remain at the increased charge current to recharge the battery 130 in less time.

If step 420 determines that the disconnected power supply was not the USB power, then the method 400 continues to step 422. That is, the second power supply was disconnected and the remaining power is the USB power. In step 422, the controller 115 enables the USB-specific parameters. As discussed above, the controller 115 may set the charger 125 with settings that correspond with power parameters used with the USB power. Also, as discussed above, if the USB-specific parameters are irrelevant (such as when step 412 is bypassed), then the method 400 may bypass step 422.

In step 424, the controller 115 decreases the charge current to the maximum non-negotiable charge current (e.g., 100 ma). When the USB power is the only power source to recharge the battery 130, the controller 115 may utilize a maximum charge current from the host device (e.g., 100 ma) without the need for the processor 110. In step 426, the processor 110 negotiates for an increased charge current (e.g., 500 ma) from the host. It should be noted that the method 400 may include an intermediary step(s) that determines if the battery 130 contains enough charge to activate and operate the processor 110. That is, the method 400 may incorporate steps 204-222 of the method 200.

In step 428, a determination is made whether an increase in charge current is allowed. If the increased charge current is allowed by the host, the method 400 continues to step 430 where the controller 115 increases the charge current on the charger 125 from the maximum non-negotiable charge current (e.g., 100 ma) to the increased charge current (e.g., 500 ma). If the increased charge current is not allowed by the host, the method 400 continues to step 432 where the controller 115 indicates to the charger 125 to continue using the maximum non-negotiable charge current (e.g., 100 ma). The steps 428-432 may correspond substantially with the steps 224-232 of the method 200 of FIG. 2. Consequently, the method 400 may also include a further step where a feedback path exists to return to the negotiating step 426. The method 400 continues to step 434 where the battery 130 is fully charged.

It should be noted that the above described exemplary methods (e.g., method 200, method 400) may include additional steps or includes fewer steps. For example, as described above with reference to method 400, steps 412 and 422 may be bypassed. In another example, as described with reference to method 200, step 232 may be bypassed to recharge the battery at 100 ma. The methods 200, 400 may also include additional steps as described above. For example, an initial step may be used to connect the power supplies to the mobile unit.

The above described exemplary embodiments allow for a battery of a mobile unit to be recharged using a variety of power supplies. The power supplies may range from a low rate source such as a USB supply or a high rate source such as a wall socket. The exemplary methods allow for the battery to be recharged using a combination of the available power supplies. Furthermore, the exemplary methods allow for the battery to be recharged using a USB power supply despite the battery being completely discharged.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A method, comprising:
   detecting first and second power supplies to recharge a battery for a mobile unit;
   setting, by a controller, a first charge current to recharge the battery, the first charge current based on the first power supply;
   determining if one of the first and second power supplies has been disconnected;
   continuing to recharge the battery with the first charge current when the first power supply remains connected and the second power supply is disconnected; and
   setting, by the controller, a second charge current to recharge the battery to one of a non-negotiable current value and a negotiable current value above the non-negotiable current value when the second power supply remains connected and the first power supply is disconnected, the second charge current based on the second power supply, wherein the negotiable current value is negotiated when the battery is charged to a level configured to activate a processor in the mobile unit.

2. The method of claim 1, wherein first power supply is a high rate power source.

3. The method of claim 1, wherein the second power supply is a universal serial bus power supply.

4. The method of claim 1, wherein the first charge current is greater than 500 milli-amperes.

5. The method of claim 1, wherein the second charge current is a maximum of 500 milli-amperes.

6. A system, comprising:
   a first port connected to a first power supply;
   a second port connected to a second power supply;
   a processor powered by a battery; and
   a controller detecting the first and second power supplies and setting a first charge current to recharge the battery, the first charge current based on the first power supply, wherein the controller determines if one of the first and second power supplies has been disconnected, the controller continues to recharge the battery with the first charge current when the first power supply remains connected and the second power supply is disconnected, the controller sets a second charge current to recharge the battery to one of a non-negotiable current value and a negotiable current value above the non-negotiable current value when the second power supply remains connected and the first power supply is disconnected, the second charge current based on the second power supply, wherein the negotiable current value is negotiated when the battery is charged to a level configured to activate the processor.

7. The system of claim 6, wherein first power supply is a high rate power supply.

8. The system of claim 6, wherein the second power supply is a universal serial bus power supply.

9. A system, comprising:
   a first connection means for connecting to a first power supply;
   a second connecting means for connecting to a second power supply;
   a processor powered by a battery; and
   a controlling means detecting the first and second power supplies and setting a first charge current to recharge the battery, the first charge current based on the first power supply, wherein the controlling means determines if one of the first and second power supplies has been disconnected, the controlling means continues to recharge the battery with the first charge current when the first power supply remains connected and the second power supply is disconnected, the controlling means sets a second charge current to recharge the battery to one of a non-negotiable current value and a negotiable current value above the non-negotiable current value when the second power supply remains connected and the first power supply is disconnected, the second charge current based on the second power supply, wherein the negotiable current value is negotiated when the battery is charged to a level configured to activate the processor.

* * * * *